United States Patent
Tong et al.

(10) Patent No.: US 9,606,801 B2
(45) Date of Patent: Mar. 28, 2017

(54) METHOD AND APPARATUS FOR ASYNCHRONOUS PROCESSOR BASED ON CLOCK DELAY ADJUSTMENT

(71) Applicant: Huawei Technologies Co., Ltd., Shenzhen (CN)

(72) Inventors: Wen Tong, Ottawa (CA); Yiqun Ge, Kanata (CA); Qifan Zhang, Lachine (CA); Wuxian Shi, Kanata (CA); Tao Huang, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 213 days.

(21) Appl. No.: 14/480,531

(22) Filed: Sep. 8, 2014

(65) Prior Publication Data

US 2015/0074446 A1 Mar. 12, 2015

Related U.S. Application Data

(60) Provisional application No. 61/874,794, filed on Sep. 6, 2013, provisional application No. 61/874,810, filed
(Continued)

(51) Int. Cl.
*G06F 9/00* (2006.01)
*G06F 15/177* (2006.01)
(Continued)

(52) U.S. Cl.
CPC ............ *G06F 9/30145* (2013.01); *G06F 1/08* (2013.01); *G06F 1/10* (2013.01); *G06F 9/30036* (2013.01);
(Continued)

(58) Field of Classification Search
CPC .......... G06F 1/08; G06F 1/10; G06F 9/30145; G06F 9/3851; G06F 9/3885; G06F 9/5011
(Continued)

(56) References Cited

U.S. PATENT DOCUMENTS 5,430,884 A 7/1995 Beard et al.
5,598,113 A 1/1997 Jex et al.
(Continued)

FOREIGN PATENT DOCUMENTS

EP 0 335 514 A2 10/1989
EP 0 529 369 A2 3/1993
(Continued)

OTHER PUBLICATIONS

Ivan E. Sutherland, "Micropipelines", Communications of the ACM, vol. 32, No. 6, Jun. 1989, p. 720-738.
(Continued)

*Primary Examiner* — Mark Connolly
(74) *Attorney, Agent, or Firm* — Slater Matsil, LLP

(57) ABSTRACT

A clock-less asynchronous processing circuit or system utilizes a self-clocked generator to adjust the processing delay (latency) needed/allowed to the processing cycle in the circuit/system. The timing of the self-clocked generator is dynamically adjustable depending on various parameters. These parameters may include processing instruction, opcode information, type of processing to be performed by the circuit/system, or overall desired processing performance. The latency may also be adjusted to change processing performance, including power consumption, speed etc.

14 Claims, 12 Drawing Sheets

Related U.S. Application Data on Sep. 6, 2013, provisional application No. 61/874,856, filed on Sep. 6, 2013, provisional application No. 61/874,914, filed on Sep. 6, 2013, provisional application No. 61/874,880, filed on Sep. 6, 2013, provisional application No. 61/874,889, filed on Sep. 6, 2013, provisional application No. 61/874,866, filed on Sep. 6, 2013.

(51) Int. Cl.
*G06F 9/30* (2006.01)
*G06F 9/38* (2006.01)
*G06F 1/08* (2006.01)
*G06F 1/10* (2006.01)
*G06F 9/50* (2006.01)

(52) U.S. Cl.
CPC .......... *G06F 9/3851* (2013.01); *G06F 9/3853* (2013.01); *G06F 9/3871* (2013.01); *G06F 9/3885* (2013.01); *G06F 9/3891* (2013.01); *G06F 9/5011* (2013.01)

(58) Field of Classification Search
USPC .......................................................... 713/1
See application file for complete search history.

(56) References Cited

U.S. PATENT DOCUMENTS

| | | | |
|---|---|---|---|
| 5,758,176 A | 5/1998 | Agarwal et al. | |
| 5,842,034 A | 11/1998 | Bolstad et al. | |
| 5,987,620 A | 11/1999 | Tran | |
| 6,108,769 A | 8/2000 | Chinnakonda et al. | |
| 6,633,971 B2 | 10/2003 | Peng et al. | |
| 6,658,581 B1* | 12/2003 | Takahashi | G06F 1/10 706/13 |
| 7,313,673 B2* | 12/2007 | Abernathy | G06F 9/30079 712/214 |
| 7,353,364 B1 | 4/2008 | Chong et al. | |
| 7,376,812 B1 | 5/2008 | Sanghavi et al. | |
| 7,533,248 B1 | 5/2009 | Golla et al. | |
| 7,605,604 B1 | 10/2009 | Young | |
| 7,681,013 B1 | 3/2010 | Trivedi et al. | |
| 7,698,505 B2* | 4/2010 | Temple, III | G06F 12/0815 711/119 |
| 7,752,420 B2* | 7/2010 | Izawa | G06F 15/7867 712/15 |
| 7,936,637 B2 | 5/2011 | Shori | |
| 8,005,636 B2 | 8/2011 | Shipton et al. | |
| 8,125,246 B2 | 2/2012 | Grochowski et al. | |
| 8,307,194 B1 | 11/2012 | Scott et al. | |
| 8,464,025 B2 | 6/2013 | Yamaguchi et al. | |
| 8,689,218 B1 | 4/2014 | Awad et al. | |
| 2002/0124155 A1 | 9/2002 | Sami et al. | |
| 2002/0156995 A1 | 10/2002 | Martin et al. | |
| 2003/0065900 A1 | 4/2003 | Mes | |
| 2004/0046590 A1 | 3/2004 | Singh et al. | |
| 2004/0064750 A1 | 4/2004 | Conway | |
| 2004/0103224 A1 | 5/2004 | Duresky et al. | |
| 2004/0215772 A1 | 10/2004 | Dinker et al. | |
| 2005/0038978 A1 | 2/2005 | Nickolls et al. | |
| 2005/0251773 A1 | 11/2005 | Bair et al. | |
| 2006/0075210 A1 | 4/2006 | Manohar et al. | |
| 2006/0176309 A1 | 8/2006 | Gadre et al. | |
| 2006/0242386 A1 | 10/2006 | Wood | |
| 2006/0277425 A1 | 12/2006 | Renno et al. | |
| 2007/0150697 A1 | 6/2007 | Sachs | |
| 2007/0186071 A1 | 8/2007 | Bellows et al. | |
| 2008/0238494 A1 | 10/2008 | Ortiz et al. | |
| 2009/0217232 A1 | 8/2009 | Beerel et al. | |
| 2010/0278190 A1 | 11/2010 | Yip et al. | |
| 2010/0313060 A1 | 12/2010 | Bjorklund et al. | |
| 2011/0057699 A1 | 3/2011 | Szczypinski | |
| 2011/0072236 A1 | 3/2011 | Mimar | |
| 2011/0072238 A1 | 3/2011 | Mimar | |
| 2012/0066480 A1 | 3/2012 | Hanaki et al. | |
| 2012/0159217 A1 | 6/2012 | Venkataramanan et al. | |
| 2013/0024652 A1 | 1/2013 | Bailey et al. | |
| 2013/0080749 A1 | 3/2013 | Ito et al. | |
| 2013/0331954 A1 | 12/2013 | McConnell et al. | |
| 2013/0346729 A1 | 12/2013 | Barowski et al. | |
| 2014/0189316 A1 | 7/2014 | Govindu et al. | |
| 2014/0281370 A1 | 9/2014 | Khan | |
| 2015/0074443 A1 | 3/2015 | Huang et al. | |
| 2015/0074446 A1 | 3/2015 | Tong et al. | |

FOREIGN PATENT DOCUMENTS

| | | |
|---|---|---|
| EP | 0 328 721 B1 | 4/1995 |
| WO | WO 2006/055546 A2 | 5/2006 |

OTHER PUBLICATIONS

IEEE 100 The Authoritative Dictionary of IEEE Standards Terms, 7th Ed., 2000, 4 pages.

Sutherland, "Micropipelines," Communications of the ACM, vol. 32, No. 6, Jun. 1989, pp. 720-738.

Hennessy, et al., "Computer Architecture A Quantitative Approach," (4th Ed. 2007), pp. 92-97, A-17, A-18, E-56 to E-62.

Laurence, "Low-Power High-Performance Asynchronous General Purpose ARMv7 Processor for Multi-core Applications," presentation slides, 13th Int'l Forum on Embedded MPSoC and Multicore, Jul. 2013, Octasic Inc., 52 pages.

Laurence, "Introduction to Octasic Asynchronous Processor Technology," May 2012, IEEE 18th International Symposium on Asynchronous Circuits and Systems, pp. 113-17.

Berekovic et al., "A programmable Co-processor for MPEG-4 video," Proceedings, IEEE International Conference on Acoustics, Speech, and Signal Processing, May 2001, pp. 1021-24.

Wada et al., "A VLIW Vector Media Coprocessor With Cascaded SIMD ALUs," IEEE Transactions on Very Large Scale Integration (VLSI) Systems, Vol. 17, No. 9, Sep. 2009, pp. 1285-95.

* cited by examiner

METHOD AND APPARATUS FOR ASYNCHRONOUS PROCESSOR BASED ON CLOCK DELAY ADJUSTMENT

CROSS REFERENCE TO RELATED APPLICATIONS

This application claims priority under 35 USC 119(e) to U.S. Provisional Application Ser. No. 61/874,794, 61/874,810, 61/874,856, 61/874,914, 61/874,880, 61/874,889, and 61/874,866, all filed on Sep. 6, 2013, and all of which are incorporated herein by reference.

This application is related to:

U.S. patent application Ser. No. 14/480,491 entitled "METHOD AND APPARATUS FOR ASYNCHRONOUS PROCESSOR WITH FAST AND SLOW MODE" and filed on the same date herewith, and which is incorporated herein by reference;

U.S. patent application Ser. No. 14/480,573 entitled "METHOD AND APPARATUS FOR ASYNCHRONOUS PROCESSOR WITH AUXILIARY ASYNCHRONOUS VECTOR PROCESSOR" and filed on the same date herewith, and which is incorporated herein by reference;

U.S. patent application Ser. No. 14/480,522 entitled "METHOD AND APPARATUS FOR ASYNCHRONOUS PROCESSOR REMOVAL OF META-STABILITY" and filed on the same date herewith, and which is incorporated herein by reference;

U.S. patent application Ser. No. 14/480,561 entitled "METHOD AND APPARATUS FOR ASYNCHRONOUS PROCESSOR WITH A TOKEN RING BASED PARALLEL PROCESSOR SCHEDULER" and filed on the same date herewith, and which is incorporated herein by reference;

U.S. patent application Ser. No. 14/480,556 entitled "METHOD AND APPARATUS FOR ASYNCHRONOUS PROCESSOR PIPELINE AND BYPASS PASSING" and filed on the same date herewith, and which is incorporated herein by reference.

TECHNICAL FIELD

The present disclosure relates generally to asynchronous circuit technology, and more particularly, to a self-clocked circuit generating a clocking signal using a programmable time period.

BACKGROUND

High performance synchronous digital processing systems utilize pipelining to increase parallel performance and throughput. In synchronous systems, pipelining results in many partitioned or subdivided smaller blocks or stages and a system clock is applied to registers between the blocks/stages. The system clock initiates movement of the processing and data from one stage to the next, and the processing in each stage must be completed during one fixed clock cycle. When certain stages take less time than a clock cycle to complete processing, the next processing stages must wait—increasing processing delays (which are additive).

In contrast, asynchronous systems (i.e., clockless) do not utilize a system clock and each processing stage is intended, in general terms, to begin its processing upon completion of processing in the prior stage. Several benefits or features are present with asynchronous processing systems. Each processing stage can have a different processing delay, the input data can be processed upon arrival, and consume power only on demand.

FIG. 1 illustrates a prior art Sutherland asynchronous micro-pipeline architecture 100. The Sutherland asynchronous micro-pipeline architecture is one form of asynchronous micro-pipeline architecture that uses a handshaking protocol built by Muller-C elements to control the micro-pipeline building blocks. The architecture 100 includes a plurality of computing logic 102 linked in sequence via flip-flops or latches 104 (e.g., registers). Control signals are passed between the computing blocks via Muller C-elements 106 and delayed via delay logic 108. Further information describing this architecture 100 is published by Ivan Sutherland in Communications of the ACM Volume 32 Issue 6, June 1989 pages 720-738, ACM New York, N.Y., USA, which is incorporated herein by reference.

Now turning to FIG. 2, there is illustrated a typical section or processing stage of a synchronous system 200. The system 200 includes flip-flops or registers 202, 204 for clocking an output signal (data) 206 from a logic block 210. On the right side of FIG. 2 there is shown an illustration of the concept of meta-stability. Set-up times and hold times must be considered to avoid meta-stability. In other words, the data must be valid and held during the set-up time and the hold time, otherwise a set-up violation 212 or a hold violation 214 may occur. If either of these violations occurs, the synchronous system may malfunction. The concept of meta-stability also applies to asynchronous systems. Therefore, it is important to design asynchronous systems to avoid meta-stability. In addition, like synchronous systems, asynchronous systems also need to address various potential data/instruction hazards, and should include a bypassing mechanism and pipeline interlock mechanism to detect and resolve hazards.

Accordingly, there are needed asynchronous processing systems, asynchronous processors, and methods of asynchronous processing that are stable, and detect and resolve potential hazards (i.e., remove meta-stability).

SUMMARY

According to one embodiment, there is provided an asynchronous processing system including an asynchronous logic circuit configured to perform at least one processing function on input data, a self-clocked generator coupled to the asynchronous logic circuit and configured to receive a trigger signal and output a self-clocking signal within a period of time after receiving the trigger signal, wherein the period of time is configurable, and a data storage element configured to store processed data from the asynchronous logic circuit in response to the self-clocking signal.

In another embodiment, there is provided a method of operating an asynchronous processing system including asynchronous logic circuitry. The method includes receiving a first processing instruction and identifying from the first processing instruction a first type of processing to be performed by the asynchronous logic circuitry pursuant to the first processing instruction. A first processing delay period of time is determined from the identified first type of processing. The method further includes configuring a self-clock generator coupled to the asynchronous logic circuitry to output a self-clocking signal after receiving a trigger signal in accordance with the determined first processing delay period of time.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Asynchronous technology seeks to eliminate the need of synchronous technology for a global clock-tree which not only consumes an important portion of the chip power and die area, but also reduces the speed(s) of the faster parts of the circuit to match the slower parts (i.e., the final clock-tree rate derives from the slowest part of a circuit). To remove the clock-tree (or minimize the clock-tree), asynchronous technology requires special logic to realize a handshaking protocol between two consecutive clock-less processing circuits. Once a clock-less processing circuit finishes its operation and enters into a stable state, a signal (e.g., a "Request" or "Complete" signal) is triggered and issued to its ensuing circuit. If the ensuing circuit is ready to receive the data, the ensuing circuit sends a signal (e.g., an "ACK" signal) to the preceding circuit. Although the processing latencies of the two circuits are different and varying with time, the handshaking protocol ensures the correctness of a circuit or a cascade of circuits.

Hennessy and Patterson coined the term "hazard" for situations in which instructions in a pipeline would produce wrong answers. A structural hazard occurs when two instructions might attempt to use the same resources at the same time. A data hazard occurs when an instruction, scheduled blindly, would attempt to use data before the data is available in the register file.

Figure 1:
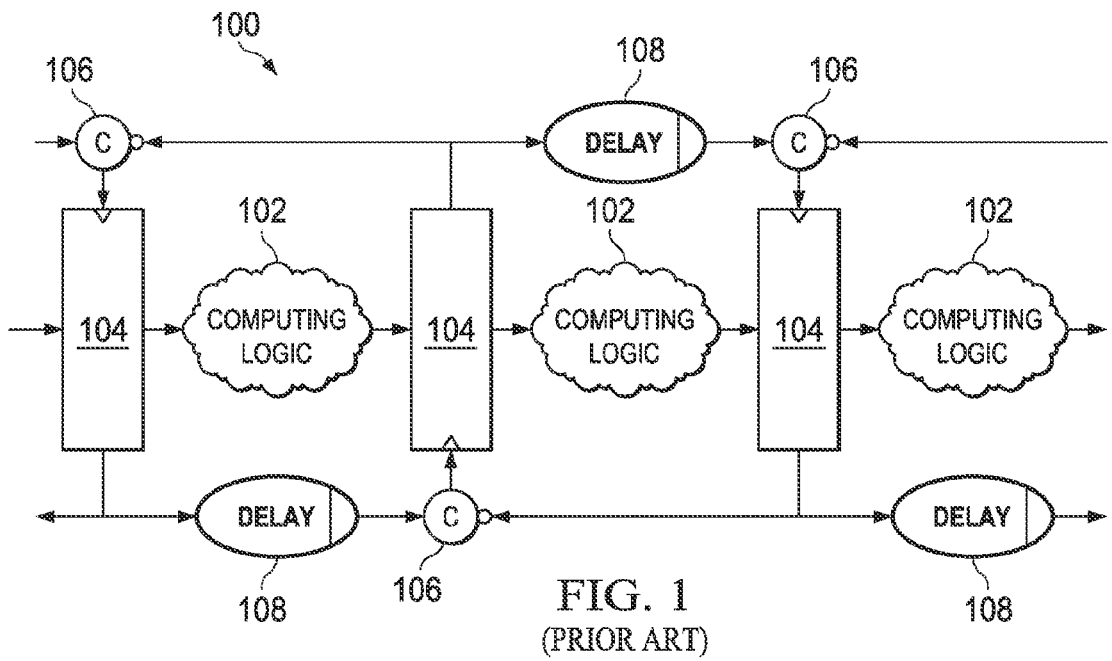
FIG. 1 illustrates a prior art asynchronous micro-pipeline architecture.
Figure 3:
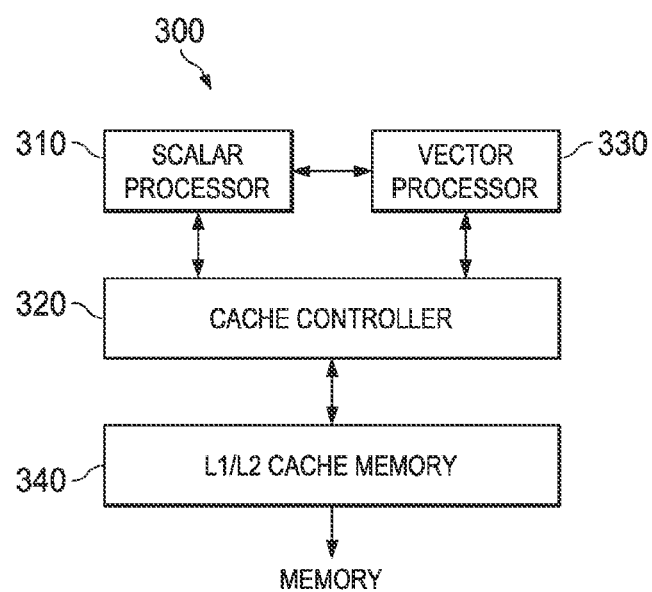
FIG. 3 illustrates an asynchronous processing system in accordance with the present disclosure.
Figure 2:
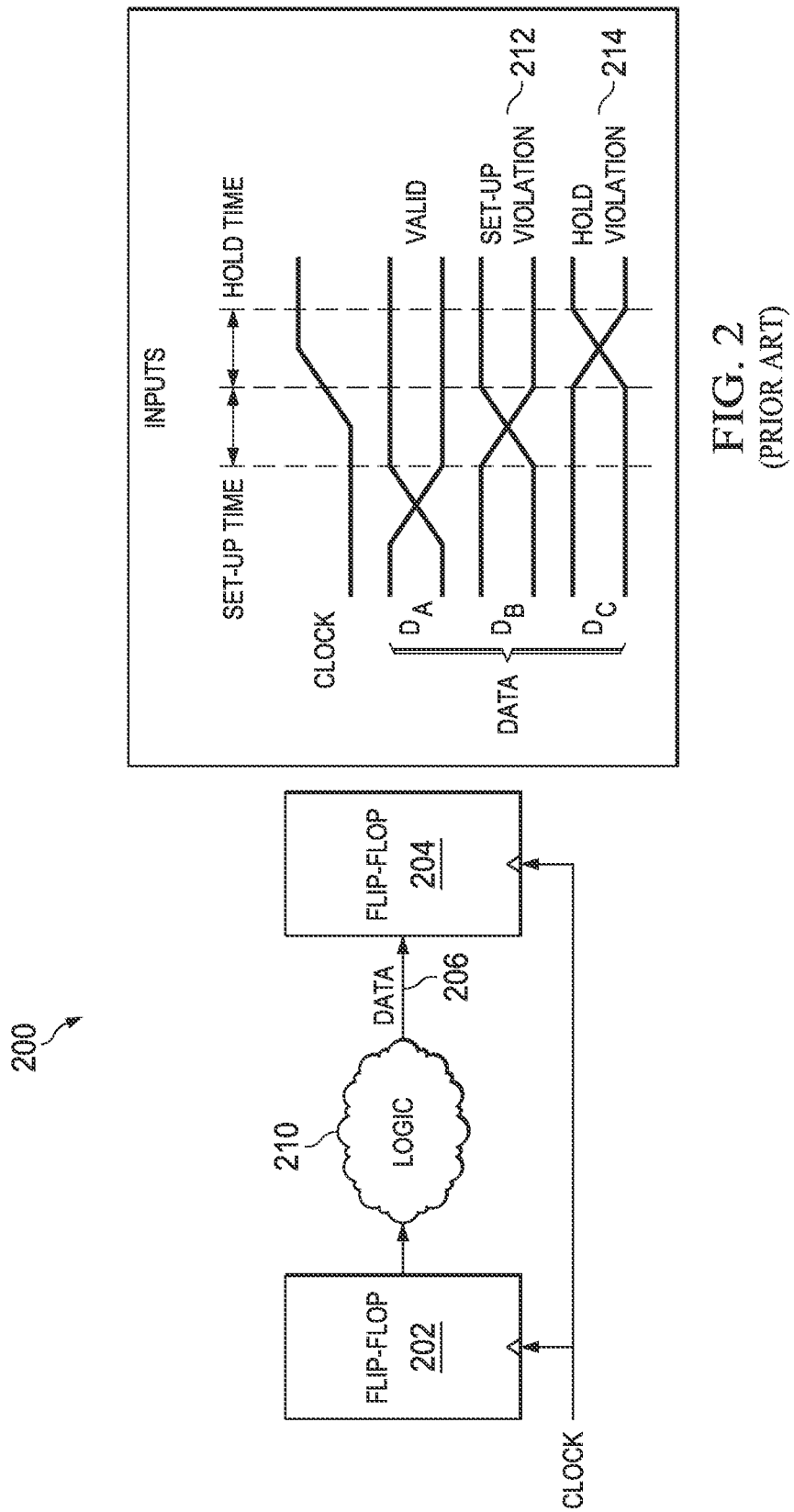
FIG. 2 is a block diagram illustrating the concept of meta-stability in a synchronous system.

With reference to FIG. 3, there is shown a block diagram of an asynchronous processing system 300 in accordance with the present disclosure. The system 300 includes an asynchronous scalar processor 310, an asynchronous vector processor 330, a cache controller 320 and L1/L2 cache memory 340. As will be appreciated, the term "asynchronous processor" may refer to the processor 310, the processor 330, or the processors 310, 330 in combination. Though only one of these processors 310, 330 is shown, the processing system 300 may include more than one of each processor. In addition, it will be understood that each processor may include therein multiple CPUs, control units, execution units and/or ALUs, etc. For example, the asynchronous scalar processor 310 may include multiple CPUs with each CPU having a desired number of pipeline stages. In one example, the processor 310 may include sixteen CPUs with each CPU having five processing stages (e.g., classic RISC stages—Fetch, Instruction Decode, Execute, Memory and Write Back). Similarly, the asynchronous vector processor 330 may include multiple CPUs with each CPU having a desired number of pipeline stages.

The L1/L2 cache memory 340 may be subdivided into L1 and L2 cache, and may also be subdivided into instruction cache and data cache. Likewise, the cache controller 320 may be functionally subdivided.

Aspects of the present disclosure provide architectures and techniques for a clock-less asynchronous processor architecture that utilizes a configurable self-clocked generator to trigger the generation of the clock signal and to avoid meta-stability problems.

Figure 4:
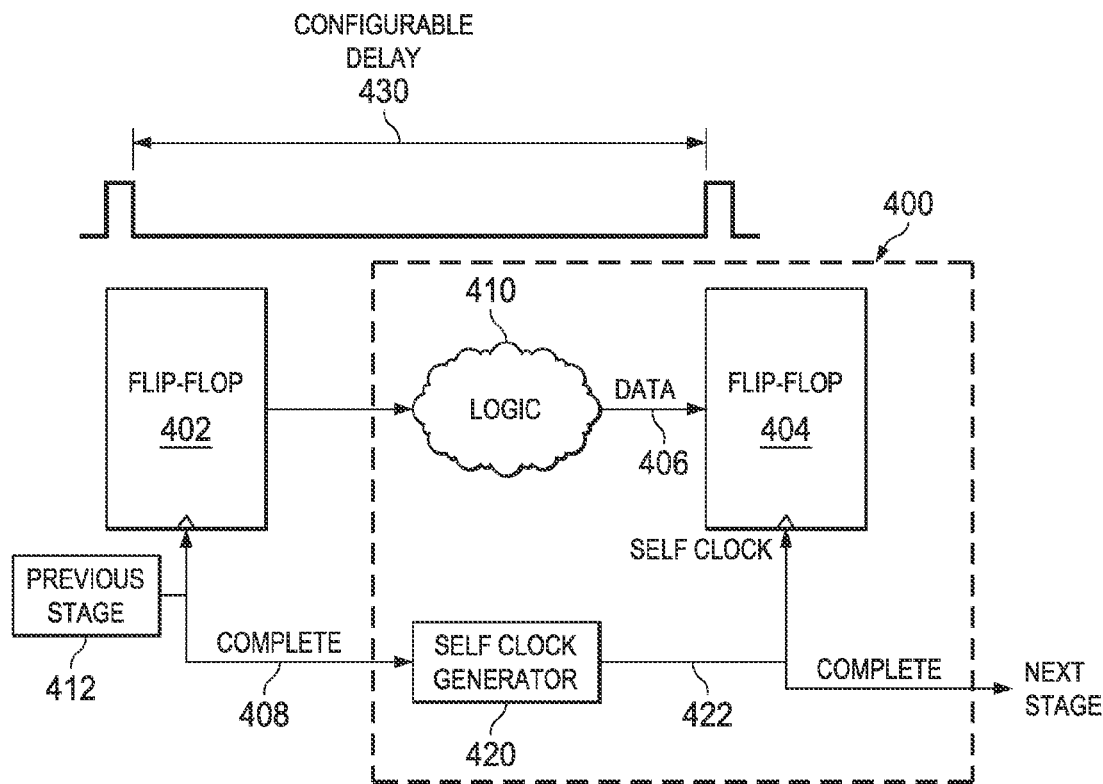
FIG. 4 is a block diagram illustrating a single asynchronous processing stage within an asynchronous processor in accordance with the present disclosure.

FIG. 4 illustrates a portion of a processing pipeline within the asynchronous processor 310 (or 330). The processing pipeline will include a plurality of successive processing stages. For illustrative purposes, FIG. 4 illustrates a single processing stage 400 within the pipeline. Each stage 400 includes a logic block 410 (or asynchronous logic circuitry), an associated self-clocked generator 420, and a data storage element or latch (or flip-flop or register) 404. In addition, a data latch (identified as 402) of a previous stage (identified as 412) is also shown. As will be appreciated for each stage, data processed by the respective logic block is output and latched into its respective data latch upon receipt of an active "complete" signal from the self-clocked generator associated with that stage. The logic block 410 may be any block or combination of processing logic configured to operate asynchronously as a unit or block. Some examples of such a block 410 may be an arithmetic logic unit (ALU), adder/multiplier unit, memory access logic, etc. In one example, which will be utilized hereafter to further explain the teachings and concepts of the present disclosure, the logic block 410 is a logic block configured to perform at least two different functions, such as an adder/multiplier unit. In this example, the logic block 410 has two processing time delays: the processing time required to complete the adding function and the processing time required to complete the multiplication function. In other words, the period of time between trigger and latching.

Data processed from the previous stage is latched into the data latch 402 (the previous stage has completed its processing cycle) in response to an active Complete signal 408. The Complete signal 408 (or previous stage completion signal) is also input to the next stage self-clocked generator 420 indicating that the previous stage 412 has completed processing and the data in the data latch 402 is ready for further processing by stage 400. The Complete signal 408 triggers the self-clocked generator 420 and activates self-clocked generation to generate its own current active Complete signal 422. However, the self-clocked generator 420 delays outputting the current Complete signal 422 for a predetermined period of time to allow the logic block 410 to fully process the data and output processed data 406.

The processing latency or delay of the logic block 410 depends on several factors (e.g., logic processing circuit functionality, temperature, etc.). One solution to this variable latency is to configure the delay to a delay value that is at least equal to, or greater than, than the worst case latency of the logic processing circuit 410. This worst case latency is usually determined based on latency of the longest path in the worst condition. In the example of the adder/multiplier unit, the required processing delay for the adder may be 400 picoseconds, while the required processing delay for the multiplier may be 1100 picoseconds. In such case, the worst case processing delay would be 1100 picoseconds. This may be calculated based on theoretical delays (e.g., by ASIC level simulation: static timing analysis (STA) plus a margin), or may be measured during a calibration stage, of the actual logic block circuits 410. Stage processing delay values for each stage 400 (and for each path/function in each stage 400) are stored in a stage clock delay table (not shown). During the initialization, reset or booting stage (referred to hereinafter as "initialization"), these stage delay values are used to configure clock-delay logic within the self-clocked generators 420. In one embodiment, the stage delay values in the table are loaded into one or more storage register(s) (not shown) for fast access and further processing when needed. In the example of the adder/multiplier, the values 400 and 1100 (or other indicators representative of those values) are loaded into the register.

During initialization, the self-clocked generator 420 is configured to generate and output its active Complete signal 422 at a predetermined period of time after receiving the previous Complete signal 408 from the previous stage 412. To ensure proper operation (processed data will be valid upon latching) the required processing delay will equal or exceed the time necessary for the block to complete its processing. Using the same example, then when the logic block is tasked with performing an adding function, the required processing delay should equal or exceed 400 picoseconds. Similarly, when the logic block is tasked with performing a multiplication function, the required processing delay should equal or exceed 1100 picoseconds. The self-clocked generator 1420 generates its Complete signal 1422 at the desired time which latches the processed output data 406 of logic block 410 into the data latch 404. At the same time, the current active Complete signal 422 is output or passed to the next stage.

Figure 5:
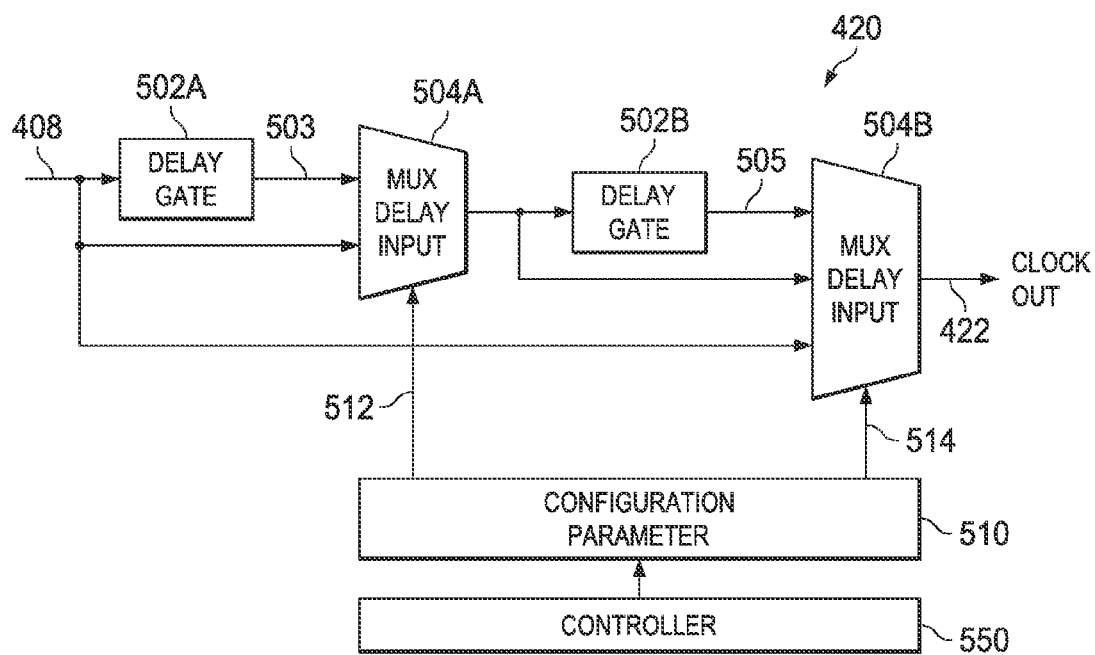
FIG. 5 is a block diagram of one implantation of the self-clocked generator shown in FIG. 4.

Now turning to FIG. 5, there is illustrated a more detailed diagram of the configurable or programmable self-clocked generator 420 of FIG. 4. The self-clocked generator 420 includes a first delay gate (or module or circuit) 502A, a second delay gate (or module or circuit) 502B, a first delay input multiplexor (mux) 504A and a second delay input multiplexer 504B. The multiplexors are configured to control an amount of delay between receipt of the previous Complete signal 408 and output (activation or assertion) of the current Complete signal 422. Thus, the self-clocked generator 420 is configured to control/program a predetermined amount of delay (or time period). In one embodiment, the programmed period is operation dependent.

A configuration parameter 510 controls operation of the multiplexors 504A, 504B to select a signal path for the previous Complete signal 408. This enables selection or configuration (programming) of when the clocking signal should be issued (i.e., how much delay)—a configurable amount of delay. For example, the first delay gate 502A may be configured to generate a signal 503 having added 500 picoseconds of delay, while the second delay gate 502B may be configured to generate a signal 505 having added 600 picoseconds of delay, for a possible total delay of 1100 picoseconds.

The configuration parameter 510 may be an N-bit select signal generated from the one or more storage registers (not shown) when the processor 310, 330 is initialized. Therefore, the select signal may select the first signal 503, the second signal 505, a combination of the first signal 503 and the second signal 505, or virtually no delay. In this example, the current Complete signal 422 may be generated and output with 0, 500, 600 or 1100 picoseconds of delay. For example, a first configuration parameter output 512 will cause the first multiplexor 504A to select and output either the delayed signal (500 picoseconds) 503 or the undelayed signal 408. Similarly, a second configuration parameter output 514 will cause the second multiplexor 504B to select and output either (1) the delayed signal 505 (which is either delayed by 500 or 1100 picoseconds), (2) the delayed signal (600 picoseconds) output from the multiplexor 504A, or (3) the undelayed signal 408. In general terms, the self-clocked generator 420 provides a programmable delay measured defined as the amount of time between receipt of the previous Clocking signal 408 and activation of the current Complete signal 422. Assertion of the Complete signal 422 latches the data and further signals the data is valid and ready for next stage processing.

In another embodiment, the configuration parameter 510 may be generated by a controller 550. The controller 550 determines which processing function (e.g., adding or multiplying) the logic block 410 will perform and programs the self-clocked generator 420 to generate the clocking signal 422 with the "correct" delay for that processing function. In other words, the controller 550 programs the self-clocked generator to issue its clocking signal after a predetermined processing time has passed. This predetermined processing time is defined and associated with the function to be performed. Various methods and means may be utilized to determine a priori which function will be performed by the logic block 410. In one example, an instruction pre-decode indicates the particular processing function will be an add function or a multiply function. This information may be stored in a register or register file. Thus, the self-clocked generator 420 is programmed to generate the clocking signal 422 a predetermined amount of time after receipt of a previous clock signal (or other signal) signaling to the logic block 422 that the input data is ready for processing. This predetermined amount of time is programmed in response to a determination of what function the logic block 422 will perform.

While first and second delay gates, first and second multiplexors, and first and second configuration parameters have been described in the examples above for ease of explanation, it should be appreciated that additional delay gates (and differing delay times) and multiplexors may be utilized.

Figure 6:
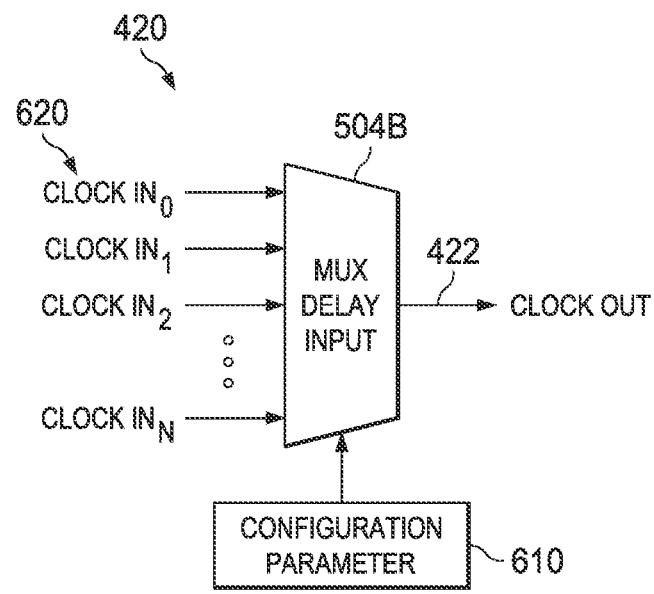
FIGS. 6 and 7 illustrate other implementations of the self-clocked generator shown in FIG. 4.

Now turning to FIG. 6, there is illustrated another implementation of the programmable delay self-clocked generator 420 having an M-to-1 multiplexer 600 with M clock input signals 620. Similar to the configuration parameter 510, an N-bit configuration parameter 610 (and/or a controller) controls multiplexer 600 to select one of the M clock inputs 620 for output of the current Complete signal 422. As will be appreciated, the clock input signals 620 are generated from the previous stage Complete signal (e.g., signal 408 in FIG. 5) and each are delayed by a different amount. The clock input signals are generated using any suitable configuration of clock delay gates/circuits (not shown). For example, if M=8, the eight clock input signals may be delayed in increments of 100 picoseconds beginning with 400 picoseconds. In such example, current Complete signal 422 can be selected to have a delay ranging from 400-1100 picoseconds, in increments of 100 picoseconds. It will be understood that any suitable number of clock input signals 620 and delay amounts can be configured and utilized.

Figure 7:
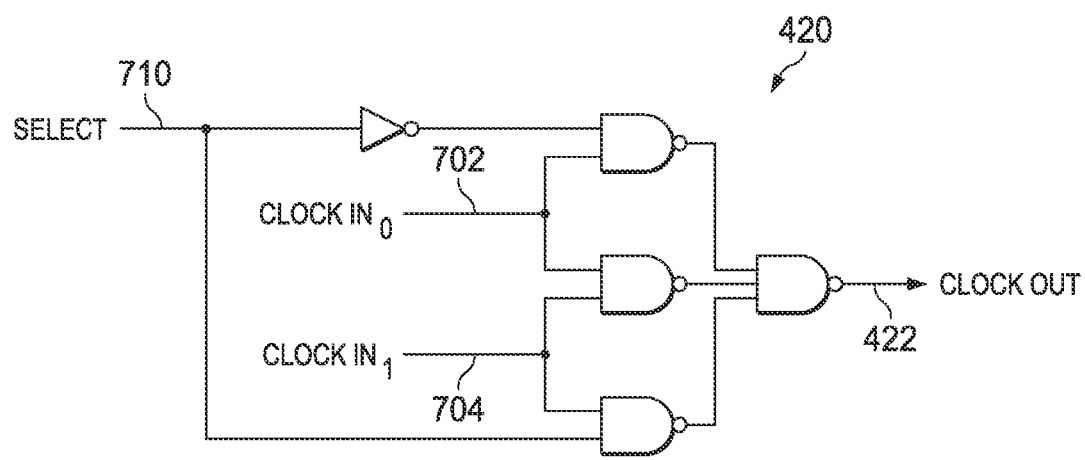

Now turning to FIG. 7, there is illustrated another implementation of the programmable delay self-clocked generator 420. In this configuration, the self-clocked generator 420 includes a number of logic gates (as shown) and two clock input signals 702, 704 configured to select and output one of the clock input signals. A single Select line 720 controls which clock input signal 702, 704 is selected and output as the clock output signal 422 (Complete signal).

Figure 8:
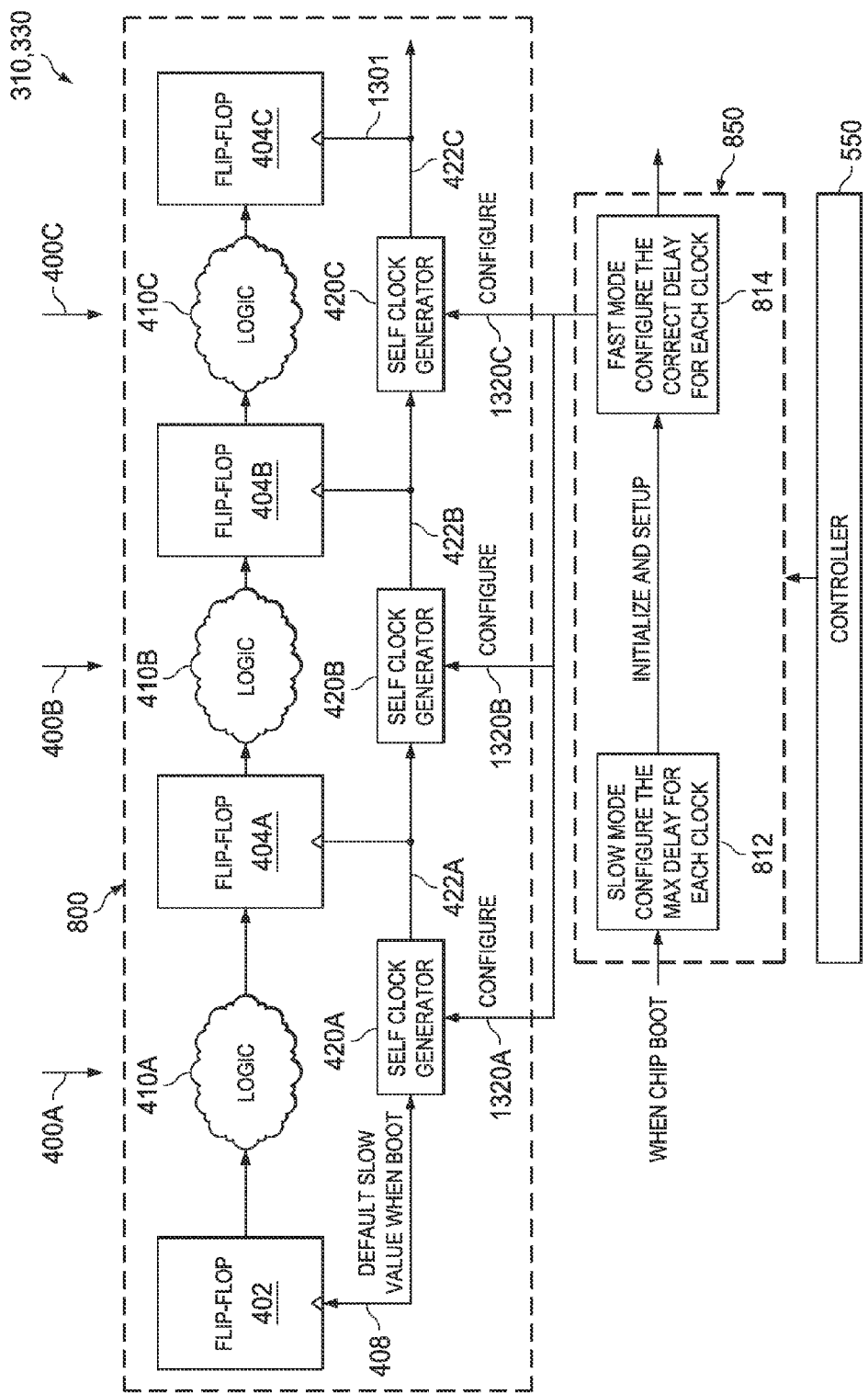
FIG. 8 is a block diagram illustrating a processing pipeline having multiple processing stages in accordance with the present disclosure.

Now turning to FIG. 8, there is illustrated a block diagram of a portion of a processing pipeline 800 having a plurality of processing stages within the asynchronous processor 310, 330. As will be appreciated, the pipeline 800 may have any number of desired stages 400. As an example only, the pipeline 800 may include 5 stages (with only 3 shown in FIG. 8) with each stage 400 providing different functionality (e.g., Instruction Fetch, Instruction Decode, Execution, Memory, Write Back). Further, the processor may include any number of separate pipelines 800 (e.g., CPUs or execution units).

As shown, the pipeline 800 includes a plurality of successive processing stages 400A, 400B, 400C. Each respective processing stage 400A, 400B and 400C includes a logic block (asynchronous logic circuitry) 410A, 410B and 410C, and associated self-clocked generators 420A, 420B and 420C and data latches 404A, 404B, 404C. Reference is made to FIG. 4 illustrating more details and operation of a stage 400.

As will be appreciated, each logic block 410A, 410B and 410C includes asynchronous logic circuitry configured to perform one or more processing functions on the input data. When data processing is complete (i.e., sufficient time has passed to complete processing), the processed data is latched into the data storage element or flip-flop 404A, 404B, 404C in response to the Complete signal 422A, 422B and 422C (which also indicates to a subsequent stage that processing is complete). Each intermediate successive stage 400 processes input data output from a previous stage.

The amount of processing time necessary for each logic block 410 to complete processing depends on the particular circuits included therein and the function(s) it performs. Each logic block 410A, 410B and 410C has one or more predetermined processing time delays which indicate the amount of time it takes to complete a processing cycle. As previously described, stage processing delay values for each stage 400 are stored in a stage clock delay table (not shown) and may be loaded into a data register or file during initialization.

For example only, the processing delays may be 500, 400 or 1100, and 600 or 800 picoseconds for stages 400A, 400b, 400C, respectively. This means that stage 400A is either capable of performing only one function (or has only one path) or can perform multiple functions, but each function requires about the same processing delay. Stages 400B, 400C are capable of performing at least two functions (or have at least two paths) with each function requiring a different processing delay.

Aspects of the present disclosure also provide architectures and techniques for a clock-less asynchronous processor that utilizes a first mode to initialize and set up the asynchronous processor during boot up and that uses a second mode during "normal" operation of the asynchronous processor.

With continued reference to FIG. 8, the processor 310, 330 includes mode selection (and delay configuration) logic 850. The mode selection circuit 850 configures the processor 310, 330 to operate in one of two modes. In one embodiment, these two modes include a Slow mode and a Fast mode. Additional modes could be configured if desired. It will be understood that the mode selection logic may be implemented using logic hardware, software or a combination thereof. The logic 850 configures, enables and/or switches the processor 310, 330 to operate in a given mode and switch between modes.

In the Slow mode, each self-clocked generator 420A, 420B, 420C is configured to generate its respective active Complete signal 422A, 422B, 422C with a maximum amount of delay (which may be the same or different for each stage). In the Fast mode, each self-clocked generator 420A, 420B, 420C is configured to generate its respective Complete signal 422A, 422B, 422C with a predetermined (or "correct") amount of delay (again, this may be the same or different for each stage, depending on functionality of the logic as well as different processing, voltage and temperature (PVT) corners). In general terms, the amount of delay in the Slow mode is greater than the amount of delay in the Fast mode and, therefore, the Fast mode performs processing at a faster speed.

Using the example above in which the processing delays are 500, 400 or 1100, and 600 or 800 picoseconds, for stages 400A, 400b, 400C, respectively, the Slow mode will initialize or program the self-clocked generators 420A, 420B, 420C for processing delays of 500, 1100 and 800 picoseconds. This ensures that each stage will be programmed with a sufficient processing delay amount to handle initialization procedures. The Fast mode enables each stage to operate in accordance with the procedures and methods described above—the processing delay for a stage will be programmed or set based on which particular function that respective logic block 410 will be performing at that time.

It will be understood there may be some hardware initialization/setup sequence(s) for which it may be desirable to operate in a slower mode to properly configure the logic. During slow mode, the delay can be set relatively large to ensure logic functionality and no meta-stability. Other examples may include applications for which the circuit speed should be slowed down, such as a special register configuration or process. As will be appreciated, different asynchronous logic circuits could be switched to faster speeds globally or locally (one by one).

Various factors may determine when the processor 310, 330 should operate in either one of the modes. These may include power consumption/dissipation requirements, operating conditions, types of processing, PVT corners, application real time requirements, etc. Different factors may apply to different applications, and any suitable determination of when to switch from one mode to another mode is within the knowledge of those skilled in the art. In other embodiments, the concepts described herein are broader, and may include switching between a first and second mode, switching between slow and fast modes, and having multiple modes (three or more). Multiple modes within normal operation may be provided, and may be implemented to vary core speeds and to adapt to different PVT or application real time requirement(s).

In one embodiment, the processor 310, 330 is configured to operate in the Slow mode during initialization and setup (e.g., boot, reset, initialization, etc.). After initialization is completed, the processor 310, 330 is configured to operate in the Fast mode —which is considered "normal" operation of the processor. The mode selection and configurable delay logic 850 includes a slow mode module 812 configured to generate a maximum delay for each of the self-clocked generators 420A-420C and a fast mode module 814 configured to generate a "correct" delay for each of the self-clocked generators 420A-420C. The maximum delay for a given self-clocked generator may be different than the maximum delay for another one of the self-clocked generators. Similarly, the "correct" delay(s) for a given self-clocked generator may be different than the "correct" delay(s) for another one of the self-clocked generators.

In one embodiment, the maximum delay for a given self-clocked generator 420 may be equal to a guaranteed delay without meta-stability+margin. For example, the configurable delay logic 850 may be configured to generate a slow mode configure signal corresponding to a slow mode delay value that is associated with a slowest speed at which the given self-clocked generator 420 can successfully process and operate. If it can perform multiple functions (or have multiple paths), the maximum processing delay for the logic block is the longest delay of the longest path of a given logic block 410 in the worst working condition. This may be measured at the wafer calibration stage for the given logic block 410 (or calculated theoretically). The configurable delay logic 850 is also configured to generate a fast mode configure signal that enables the logic block to operate in a "normal" mode—the processing delay for a stage will be programmed or set based on which particular function that respective logic block 410 will be performing at that time. Each of the self-clocked generators 420A-420C is configured to generate an active Complete signal 422A-422C in response to receipt of a corresponding delay configure signal 820A-820C from the delay logic 850.

During initialization of the processor 310, 330, the self-clocked generator 420A may receive the delay configure signal 820A and enter the slow mode during initialization and set up the processor. Alternatively, the self-clocked generator 420A may enter the slow mode by default during initialization. After completion of initialization, the self-clocked generator 420A may enter the fast mode for normal operation (in response to the delay configure signal 820A). The other self-clocked generators 420B, 420C may similarly operation in response to the delay configure signal 820B and delay configure signal 820C. Alternatively, these self-clocked generators may enter the slow mode by default during initialization, and after initialization and set up, they may enter the fast mode during normal operation (in response to the delay configure signals 820B, 820C).

During operation, the mode selection and configurable delay logic 850 is configured to generate a maximum delay such that asynchronous logic circuitry 410 executes in the first or slow mode during initialization. In a particular implementation, the slow mode may include a maximum delay for each of the self-clocked generators 420A-420C. A first flag may be written to a register or other memory location in the processor 310, 330 to maintain the slow mode until initialization is complete. Thereafter, the configurable delay logic 850 configures the self-clocked generators to generate "correct" delay(s) such that the asynchronous logic circuitry 410 executes in the second or fast mode during normal operation. Thus, in the embodiment described mainly in FIG. 8, the programmed processing delay (or period of time between trigger and latching) is mode dependent.

In addition to the above, other aspects of the present disclosure provide architectures and techniques for a clockless asynchronous processor architecture that utilizes a dynamic latency controlling mechanism.

In general terms, asynchronous logic circuitry is self-clocked a predetermined period of time (i.e., processing delay time) after receiving a trigger signal. The clocking latches the output data processed by the logic circuitry into a storage register or element (for later use). The predetermined time period is programmable and dependent on identification of the processing function to be performed by the asynchronous logic circuity. In one embodiment, the predetermined period of time is programmed based on the type of processing instruction.

In an illustrious example, assume the asynchronous logic circuitry is an arithmetic logic unit (ALU). When an instruction is received for execution, it is decoded to determine the type of processing the ALU will perform in response to the received instruction. Based on this determination, the predetermined period of time is set or programmed to a particular value. For example, when the processing type (or function) is addition, the predetermined time period is T1 (e.g., 300 picoseconds) and when it is multiplication, the predetermined time period is T2 (e.g., 800 picoseconds). These T values are, generally, equal to or greater than the processing time(s) necessary for the ALU to process data according to its respective processing function(s).

Figure 9:
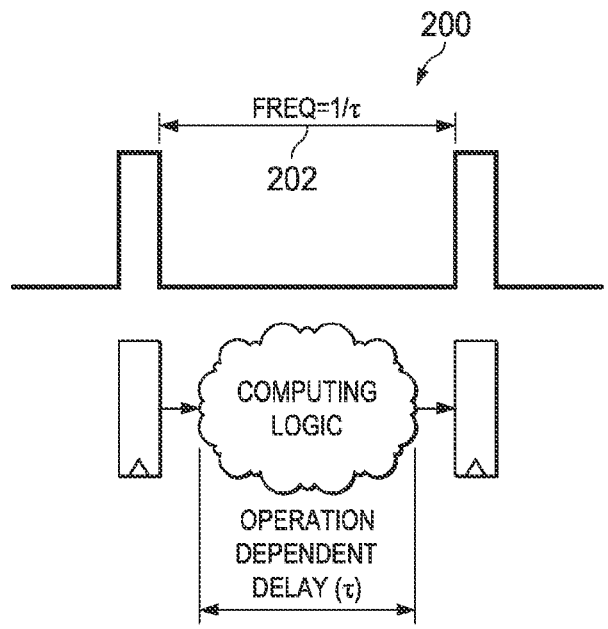
FIG. 9 is a diagram overview illustrating the concept of operation for dependent processing delays in an asynchronous logic circuit.

Turning to FIG. 9, there is a diagram overview illustrating the concept of operation dependent processing delays in an asynchronous logic circuit 900. The asynchronous circuit 900 inherently has an operation dependent delay T. The value of T is dependent on many factors known to those of ordinary skill in the art, including type and number of circuit 900, function(s), processing technology, voltage, temperature, etc. In addition, for given circuit (e.g., ALU), the delay T may have different values depending on different processing functions are being performed at the time. As will be appreciated, the asynchronous circuit 900 is the same or similar to the asynchronous logic block(s) 410 described previously.

Figure 10:
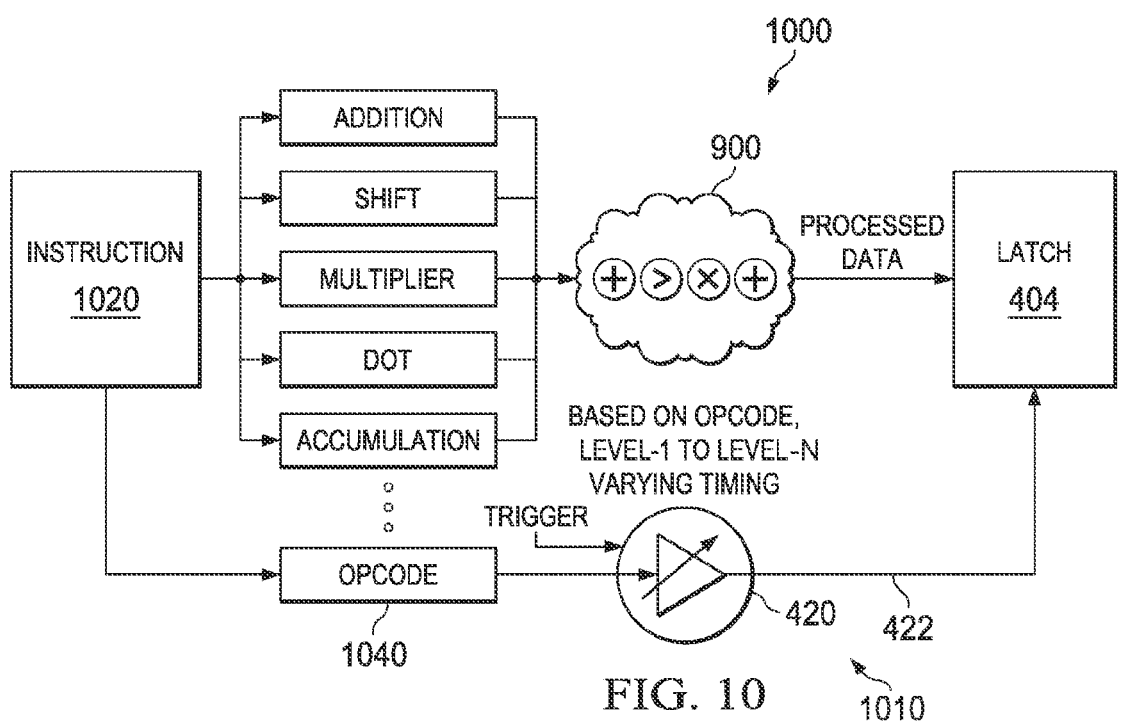
FIG. 10 conceptually illustrates the control (and programming) of a processing delay for the ALU (shown in FIG. 9)

Now turning to FIG. 10, there is illustrated an asynchronous processing system 1000 including a variable timing control system 1010 and an associated asynchronous circuit 900. In this example, the variable or programmable timing is based on type of instruction or type of processing. For purposes of the following description and illustration, we shall assume the circuit 900 is an ALU, but it may be any other suitable asynchronous logic block or circuit performing any one or multiple processing functions as desired.

The system 1000 is shown further including the self-clocked generator 422, the Complete signal 422 and the data latch 404—all associated with the ALU 900. The trigger signal may be the same as the previous complete signal 408 or another signal that triggers or initiates processing by the ALU 900.

FIG. 10 also conceptually illustrates the control (and programming) of the processing delay for the ALU 900. As shown, an instruction 1020 instructs the ALU 900 to perform a processing function. For example, the instruction 102 will identify the particular type of processing function—e.g., an addition function 1022, a shift function 1024, a multiply function 1026, a dot-pack function 1028, a accumulate function 1030. The instruction's opcode 1340 may be used to identify the type of instruction (or function) prior to execution. Based on this, the self-clock delay generator 420 is programmed or controlled to output the clock signal 422 after a predetermined time period T from receipt of the trigger signal—dependent on the process or function to be performed. Thus, the instruction 1020, and in one embodiment, the instruction opcode 1040, is used to identify the type of processing that will be performed by the ALU 900.

After an instruction is decoded and forwarded to the ALU 900, a predetermined time period T associated with the specific type of processing to be performed by the ALU (in response to the instruction) is determined. In one embodiment, a latency or delay table (not shown in FIG. 10) is stored in memory that associates different opcodes 1040 with different pre-defined process delay times. The self-clock generator 420 is then configured or programmed to the pre-defined delay, accordingly. The delay or latency varies with the opcode 1040. Each different opcode 1040 may have an associated pre-defined delay in the table, or opcodes 1040 corresponding to processing functions that need the same period of time to process may be grouped together. Further, the table may be based on different levels, such as level-1 to level-n which varies the timing. In one embodiment, the delay table may be statically provided or available upon boot up or initialization. Further, the actual pre-defined delay values may not be provided in the table, but information corresponding to the values may be provided (e.g., N-bit configuration parameter 510, see FIG. 5).

Figure 11:
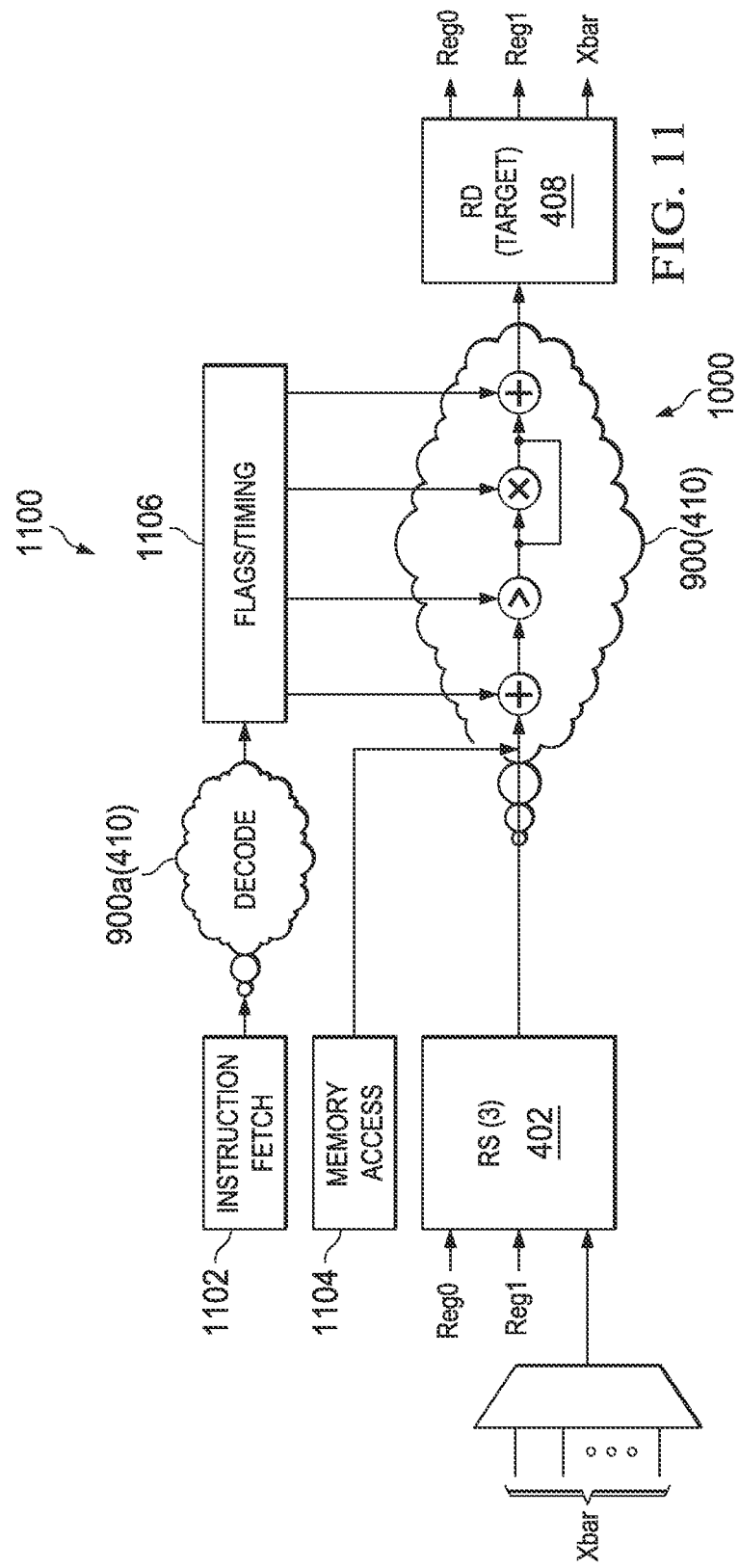
FIG. 11 illustrates an synchronous instruction decoder in combination with the asynchronous processing system (shown in FIG. 10)

Now turning to FIG. 11, there is illustrated an asynchronous instruction decoder 1100 in combination with the asynchronous processing system 1000 (shown in FIG. 10). Instructions are fetched by instruction fetch circuitry 1102 and sent to decoding circuitry 900a (410) where it is decoded and decomposed into flag/timing information stored within a flag/timing block 1106 associated with, and input to, various processing functions of the ALU 900 (e.g., addition, shift, multiply, etc.). As will be appreciated, the decoding circuitry 900a (410) may also be an asynchronous logic block with associated circuitry.

A memory access circuit 1104 is also provided which supplies requested data to the ALU 900 (and may also store data). This may also include access to registers and register files. In addition, other input data is supplied by a register source (RS) 402. Processed data is output from the ALU 900 and latched/stored into a register destination 408. As will be appreciated, the RS 402 and RD 408 are the same or similar to the data latch/storage elements 402, 408 shown in FIG. 4.

Figure 12:
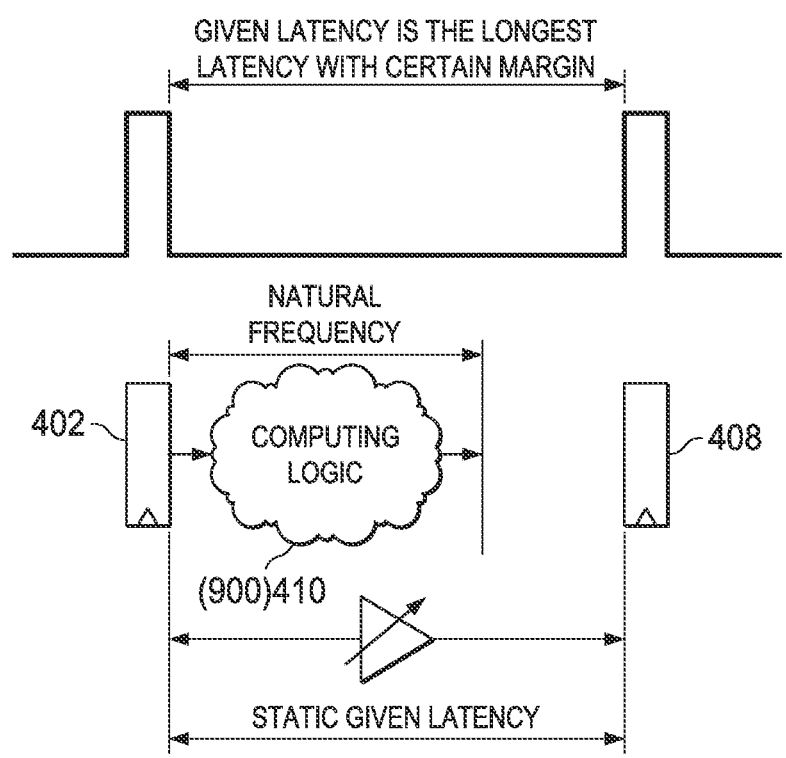
FIG. 12 illustrates conceptually static and dynamic control of the self-clock generator (shown in FIG. 4)

With reference to FIG. 12, there is illustrated conceptually the static and dynamic control of the self-clock generator(s) 420 to generate individual clocking signal(s) (Complete signal 422) within a range to ensure sufficient time to complete processing within a self-timed function unit (e.g., 410, 900) before latching the processed output data. Static given latency is the latency (or required time) with certain margin necessary for processing to complete for a give asynchronous logic block 410 under worst case conditions (which may include performing different processing types). The natural frequency is the amount of actual time the circuit will take to complete processing under a given set of conditions. In one embodiment, the self-clock generator(s) 420 may be statically configured and pre-set for a given longest latency with certain margin. This may be done at boot up and/or during an initialization stage or mode (as described more fully above). Then, the generators 420 may be dynamically adjusted based on the type of processing the logic block will perform (e.g., identified from instructions/opcodes), and/or may also dynamically adjusted based on timing by one or more algorithms as described in further detail below with respect to FIGS. 14-15.

Figure 13:
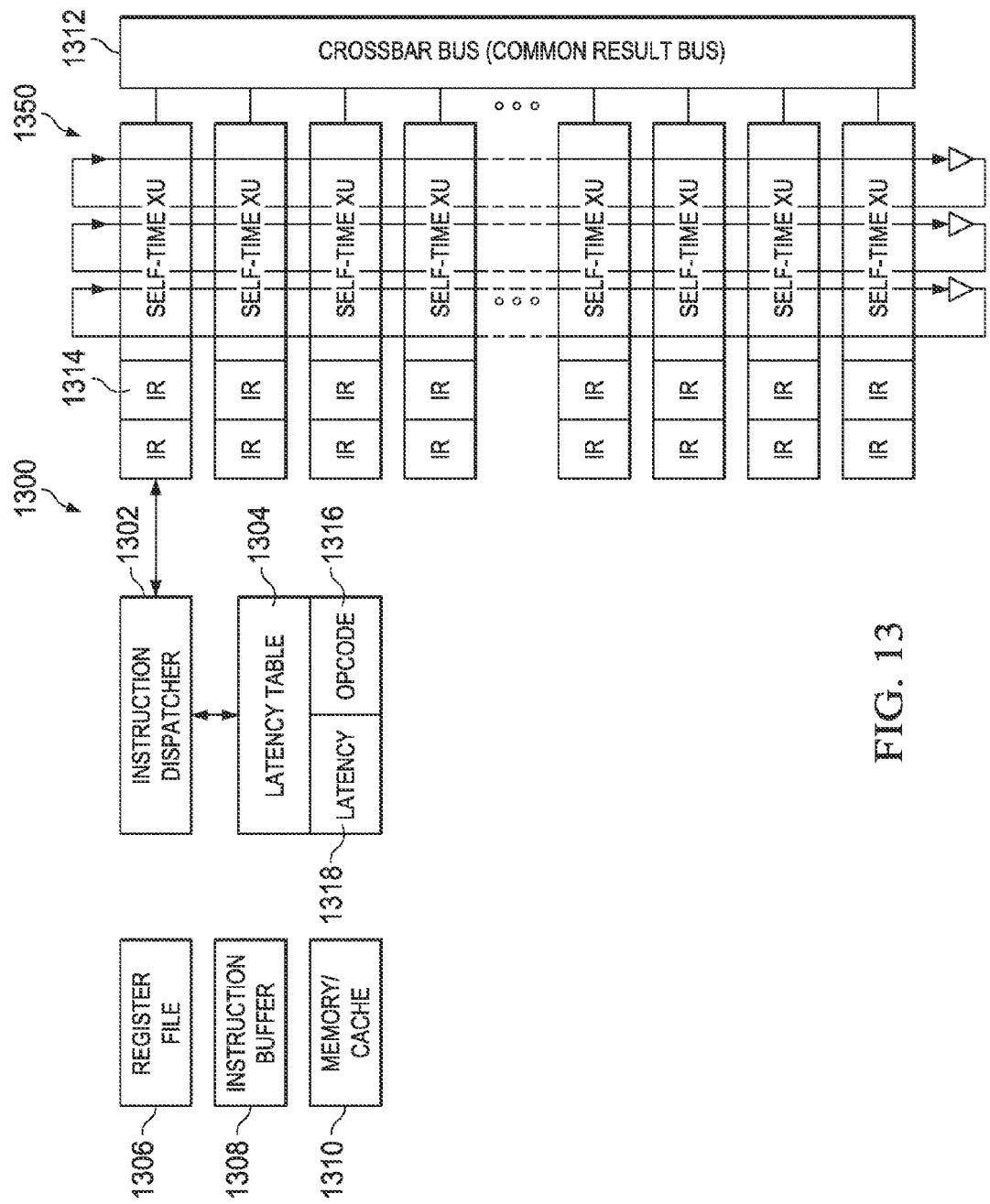
FIG. 13 is a block diagram illustrating one embodiment of a DSP architecture in accordance with the present disclosure.

Now turning to FIG. 13, there is illustrated one embodiment of a DSP architecture 1300 in accordance with the present disclosure. The DSP architecture or system 1300 includes a plurality of the self-timed (asynchronous) execution units (XU) 1350 in parallel. Each XU 1350 may include one or more successive processing stages (each having an asynchronous logic block 410 and associated self-clock generator 420). The system 1300 also includes an instruction dispatcher 1302, a latency table 1304, a register file 1306, an instruction buffer 1308, memory 1310, and a crossbar bus 1312. The instruction buffer 1308 holds instructions for dispatch, and the instruction dispatcher 1302 is configured to dispatch one or more instructions to the XUs 1350. Memory 1310 and the register file 1306 provide typical data and register storage functions.

The instruction dispatcher 1302 accesses the latency (or delay) table 1304 to determine associations between processing latency delays and instructions (e.g., opcodes). The latency or delay table 1304 stores in memory associations or correspondence between different opcodes 1316 (also 1040) and pre-defined process delay times (as further described above).

The instruction dispatcher 1302 fetches instructions from instruction buffer 1308 and selects/dispatches instructions to one or more instruction registers or buffers 1314 (e.g., FIFO) associated with each of the XUs 1350. When a particular register or buffer 1314 is full, the instruction dispatcher is notified and delays sending additional instructions.

With respect to a given instruction, the instruction can be used to identify the type of processing that needs to be performed. Upon dispatch of the instruction, the dispatcher 1302 also knows which XU 1350 will perform the processing. With this information, the self-clocked generator 420 (corresponding to the XU 1350 that will perform the processing) is controlled/configured to generate its Complete signal 422 in accordance with the pre-defined delay time associated with the identified type of processing.

In one example for illustration purposes only, an add instruction is associated with a first processing latency (e.g., 1 nanosecond) while a multiply instruction is associated with a second processing latency (e.g., 4 nanoseconds). The distinct opcodes 1316 for these two instructions are stored in the table 1304 along with their assigned pre-defined processing delays (latency) 1318. The instruction (in this example, a multiply instruction) is dispatched to a given XU 1350 and, based on the content of the dispatched instruction, the table 1304 is accessed. From this, it is determined that the pre-defined processing delay of the given XU 1350 needs to be 4 nanoseconds. The generator 420 is then controlled or programmed to generate its self-clocking signal according to this requirement when the particular instruction is being executed by the given XU 1350.

It will be understood that the table 1304 may include any number of corresponding pairs of opcode-delay combinations, depending on the number of different instructions and the amount of processing delay necessary for the instructed processing. Each additional instruction may have its own assigned processing latency.

Figure 14:
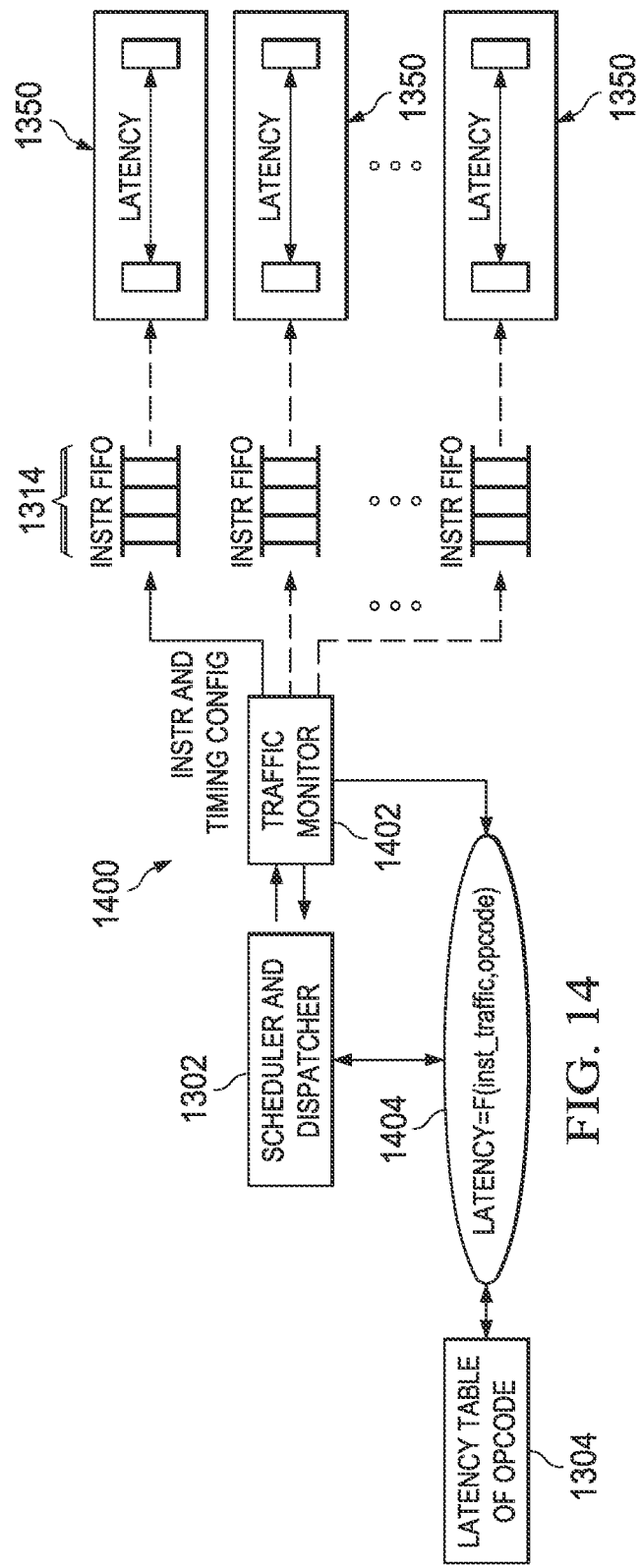
FIG. 14 shows another embodiment of a processing system in accordance with the present disclosure.

Referring to FIG. 14, there is shown another embodiment of a processing system 1400 in accordance with the present disclosure. The system 1400 includes the instruction dispatcher (and scheduler) 1302, the latency table 1304, the plurality of XUs 1350 and their associated instruction registers or FIFOs 1314. The system also includes a traffic monitor circuit 1402 and a dynamic latency generator 1404. Although illustrated as being separate or outside the dispatcher 1302, the dynamic latency generator 1404 and its functionality may form part of, or be included within, the instruction dispatcher 1302.

The traffic monitor 1402 functions to monitor and control instruction traffic and timing between the circuits. It is configured to measure the instantaneous traffic/throughput of the instructions dispatched to the XUs 1350. For example, the traffic monitor 1402 may measure average traffic dispatched by determining the type and/or complexity of the previous X (e.g., 50) instructions sent to the XUs 1250 (to each XU, or collectively) and/or an amount of time to execute the previous X instructions by the XUs 1350. This enables the traffic monitor 1402 to balance loads of the XUs 1350 and optimize overall performance of the processing system.

Based on the instruction dispatching traffic/throughput and a pre-defined strategy, protocol or policy stored within the instruction dispatcher 1302, the instruction dispatcher 1302 issues control signals e.g., F(traffic, opcode, ... table) to the XUs 1350 that result in programming/configuring of their associate self-clocked generators 420 with appropriate predetermined processing delays. This is accomplished in conjunction with a latency delay generator 1404 determining the appropriate predetermined processing delay (i.e., latency) based on a defined function F, such as F(traffic, opcode, ... table). Different functions F may be utilized or determined based on a suitable desired operational functionality.

In another embodiment, a processing delay associated or assigned to a given opcode at any given time may be different than the processing delay associated to the same given opcode at a different time (or previously). As the instruction stream goes through the instruction dispatcher 1302, the pre-defined strategy can be changed by a command instruction (e.g., static scheduling). The instruction dispatcher 1302 may also be configured to generate a signal to change a voltage of the XUs 1350 and dispatch voltage-related delays in conjunction with the delay generator 1402, such a as F(traffic, opcode, voltage, ... table).

In some embodiments, utilization of the delay generator 1402 enables an asynchronous processor to temporally increase the processing speed of a CPU, ALU, etc. and to dynamically reduce the power consumption by slowing the processing speed of the CPU, ALU, etc. through dynamic asynchronous self-clock tuning.

Figure 15:
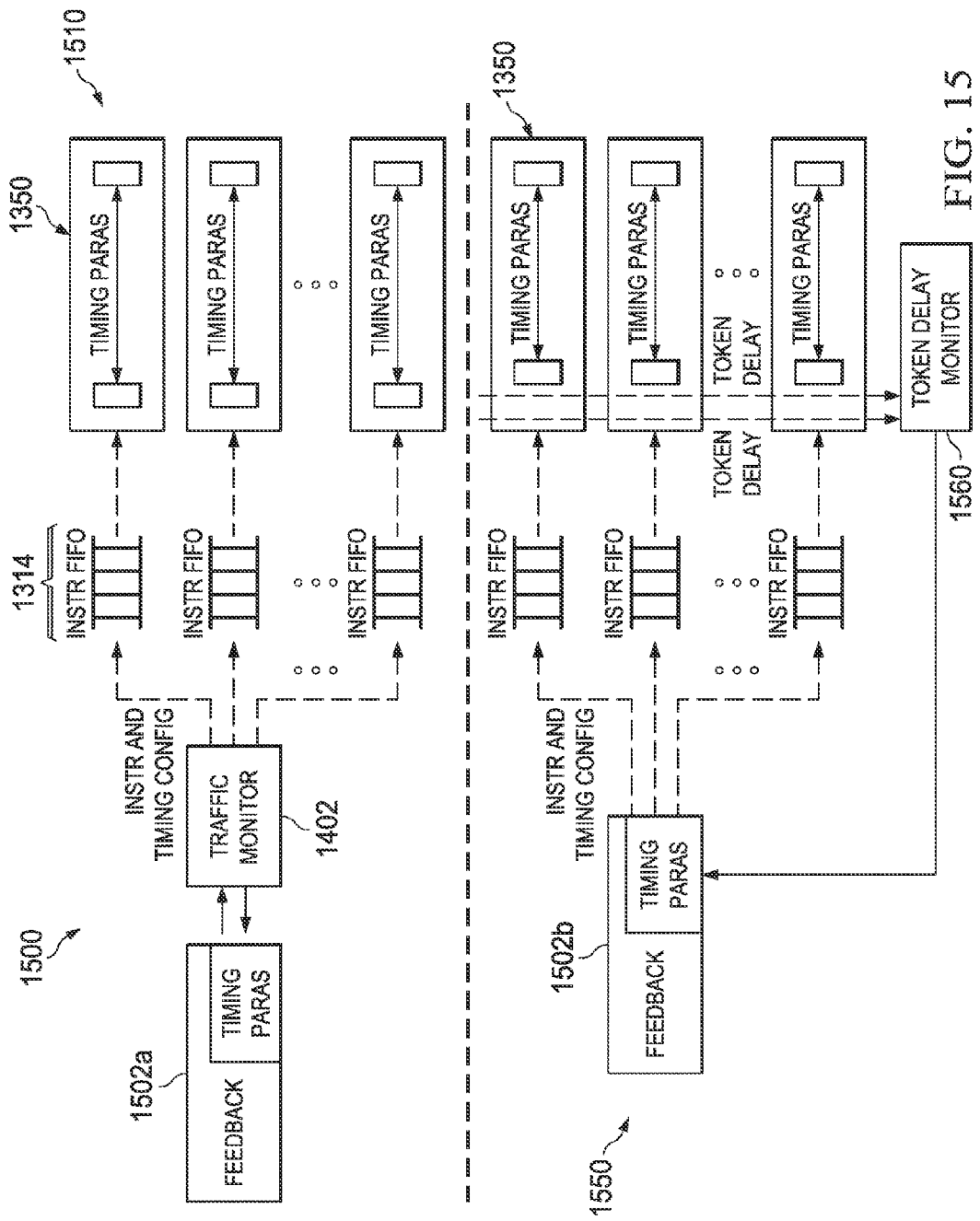
FIG. 15 illustrates two exemplary embodiments of a delay adjustment control system.

Now turning to FIG. 15 there is illustrated two exemplary embodiments of a delay adjustment control system 1500. A first embodiment identified by reference number 1510 includes a feedback engine (FBE) 1520a and the traffic monitor 1402 for monitoring instruction traffic between the BFE and the plurality of instruction FIFOs 1314 of the XUs 1350. When instruction traffic is determined to be low, processing speed of the XUs 1350 (or a particular one or group) is slowed. When instruction traffic is high, processing speed is increased.

A second embodiment identified by reference number 1550 includes a feedback engine (FBE) 1520b with no traffic monitor. Instead, the system monitors token delays from the FBE 1520b to the XUs 1350 via a token delay monitor 2560. The token delay monitor 1560 is configured to determine the delay of one or more tokens passing through the XUs 2250. When the token delay is short, processing speed of the XUs 1350 (or a particular one or group) is slowed. When the token delay is long, processing speed is increased.

The delay adjustment control system 1500 enables dynamic timing control by utilizing one or more of a performance-optimized method, a power-optimized method, a mixed method, or any combination thereof, to increase overall processing and processor performance.

A performance-optimized method begins by reducing latencies in an effort to increase the number of executed "instructions-per-second" (IPS) to a predetermined or target level (or plateau). Once this IPS level is reached, no further reduction in latencies is performed. At this IPS level, changing (increasing or decreasing) latencies is utilized to maintain this level. For example, if the IPS level begins decreasing, the method begins reducing latencies to increase IPS, if IPS level begins increasing, latencies are increased. The performance optimized method enables dynamic control of the amount of delay(s) (time allowed to complete processing of the asynchronous circuit) over instruction(s).

A power-optimized method starts by increasing latencies in an effort to decrease (slow down) the number of executed IPS to a predetermined or target level (or plateau). Once this IPS level is reached, no further increase in latencies is performed. At this IPS level adjusting (increasing or decreasing) latencies is utilized to maintain this level. The power optimized method similarly enables dynamic control of the amount of delay(s) (time allowed to complete processing of the asynchronous circuit) over instruction(s).

A mixed algorithm operates with in response to static scheduling (compiler, instruction or flag). The strategy can switch among several candidates during one application. For example, the mixed algorithm may include using both a performance-optimized algorithm and a power-optimized algorithm.

Figure 16A:
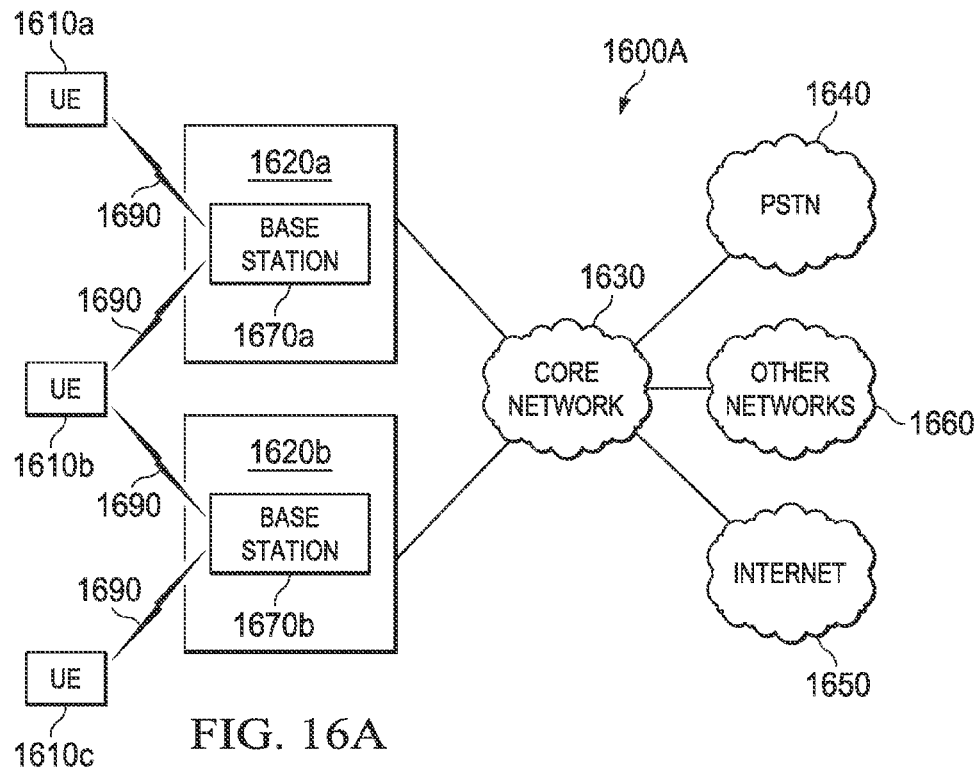
FIGS. 16A, 16B and 16C illustrate an example communication system, and example devices, in which the asynchronous processor and processing system may be utilized.

FIG. 16A illustrates an example communication system 1600A that may be used for implementing the devices and methods disclosed herein. In general, the system 1600A enables multiple wireless users to transmit and receive data and other content. The system 1600A may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 1600A includes user equipment (UE) 1610a-1610c, radio access networks (RANs) 1620a-1620b, a core network 1630, a public switched telephone network (PSTN) 1640, the Internet 1650, and other networks 1660. While certain numbers of these components or elements are shown in FIG. 16A, any number of these components or elements may be included in the system 1600A.

The UEs 1610a-1610c are configured to operate and/or communicate in the system 1600A. For example, the UEs 1610a-1610c are configured to transmit and/or receive wireless signals or wired signals. Each UE 1610a-1610c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 1620a-1620b include base stations 1670a-1670b, respectively. Each base station 1670a-1670b is configured to wirelessly interface with one or more of the UEs 1610a-1610c to enable access to the core network 1630, the PSTN 1640, the Internet 1650, and/or the other networks 1660. For example, the base stations 1670a-1670b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router, or a server, router, switch, or other processing entity with a wired or wireless network.

In the embodiment shown in FIG. 16A, the base station 1670a forms part of the RAN 1620a, which may include other base stations, elements, and/or devices. Also, the base station 1670b forms part of the RAN 1620b, which may include other base stations, elements, and/or devices. Each base station 1670a-1670b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1670a-1670b communicate with one or more of the UEs 1610a-1610c over one or more air interfaces 1690 using wireless communication links. The air interfaces 1690 may utilize any suitable radio access technology.

It is contemplated that the system 1600A may use multiple channel access functionality, including such schemes as described above. In particular embodiments, the base stations and UEs implement LTE, LTE-A, and/or LTE-B. Of course, other multiple access schemes and wireless protocols may be utilized.

The RANs 1620a-1620b are in communication with the core network 1630 to provide the UEs 1610a-1610c with voice, data, application, Voice over Internet Protocol (VoIP), or other services. Understandably, the RANs 1620a-1620b and/or the core network 1630 may be in direct or indirect communication with one or more other RANs (not shown). The core network 1630 may also serve as a gateway access for other networks (such as PSTN 1640, Internet 1650, and other networks 1660). In addition, some or all of the UEs 1610a-1610c may include functionality for communicating with different wireless networks over different wireless links using different wireless technologies and/or protocols.

Although FIG. 16A illustrates one example of a communication system, various changes may be made to FIG. 16A. For example, the communication system 1600A could include any number of UEs, base stations, networks, or other components in any suitable configuration, and can further include the EPC illustrated in any of the figures herein.

Figure 16B:
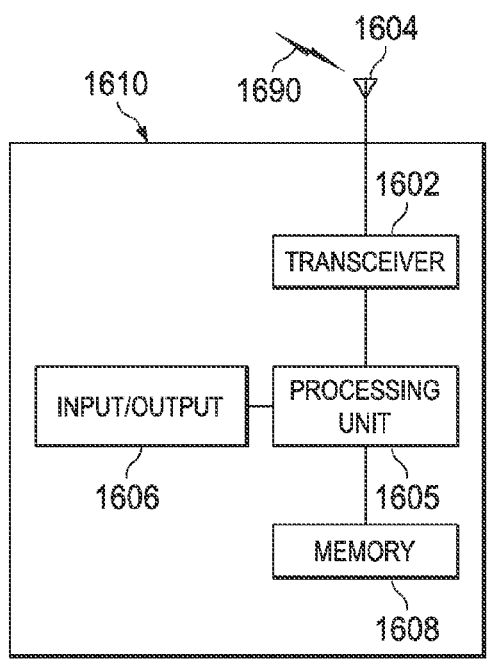
Figure 16C:
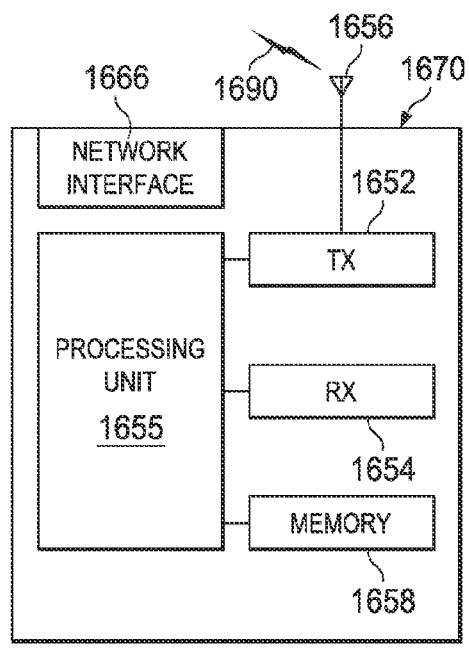

FIGS. 16B and 16C illustrate example devices that may implement the methods and teachings according to this disclosure. In particular, FIG. 16B illustrates an example UE 1610, and FIG. 16C illustrates an example base station 1670. These components could be used in the system 1600A or in any other suitable system.

As shown in FIG. 16B, the UE 1610 includes at least one processing unit 1605. The processing unit 1605 implements various processing operations of the UE 1610. For example, the processing unit 1605 could perform signal coding, data processing, power control, input/output processing, or any other functionality enabling the UE 1610 to operate in the system 1600A. The processing unit 1605 also supports the methods and teachings described in more detail above. Each processing unit 1605 includes any suitable processing or computing device configured to perform one or more operations. Each processing unit 1605 could, for example, include a microprocessor, microcontroller, digital signal processor, field programmable gate array, or application specific integrated circuit. The processing unit 1605 may be an asynchronous processor 310, 330 or the processing system 300 as described herein.

The UE 1610 also includes at least one transceiver 1602. The transceiver 1602 is configured to modulate data or other content for transmission by at least one antenna 1604. The transceiver 1602 is also configured to demodulate data or other content received by the at least one antenna 1604. Each transceiver 1602 includes any suitable structure for generating signals for wireless transmission and/or processing signals received wirelessly. Each antenna 1604 includes any suitable structure for transmitting and/or receiving wireless signals. One or multiple transceivers 1602 could be used in the UE 1610, and one or multiple antennas 1604 could be used in the UE 1610. Although shown as a single functional unit, a transceiver 1602 could also be implemented using at least one transmitter and at least one separate receiver.

The UE 1610 further includes one or more input/output devices 1606. The input/output devices 1606 facilitate interaction with a user. Each input/output device 1606 includes any suitable structure for providing information to or receiving information from a user, such as a speaker, microphone, keypad, keyboard, display, or touch screen.

In addition, the UE 1610 includes at least one memory 1608. The memory 1608 stores instructions and data used, generated, or collected by the UE 1610. For example, the memory 1608 could store software or firmware instructions executed by the processing unit(s) 1605 and data used to reduce or eliminate interference in incoming signals. Each memory 1608 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 16C, the base station 1670 includes at least one processing unit 1655, at least one transmitter 1652, at least one receiver 1654, one or more antennas 1656, one or more network interfaces 1666, and at least one memory 1658. The processing unit 1655 implements various processing operations of the base station 1670, such as signal coding, data processing, power control, input/output processing, or any other functionality. The processing unit 1655 can also support the methods and teachings described in more detail above. Each processing unit 1655 includes any suitable processing or computing device configured to perform one or more operations. Each processing unit 1655 could, for example, include a microprocessor, microcontroller, digital signal processor, field programmable gate array, or application specific integrated circuit. The processing unit 1655 may be an asynchronous processor 310, 330 or the processing system 300 as described herein.

Each transmitter 1652 includes any suitable structure for generating signals for wireless transmission to one or more UEs or other devices. Each receiver 1654 includes any suitable structure for processing signals received wirelessly from one or more UEs or other devices. Although shown as separate components, at least one transmitter 1652 and at least one receiver 1654 could be combined into a transceiver. Each antenna 1656 includes any suitable structure for transmitting and/or receiving wireless signals. While a common antenna 1656 is shown here as being coupled to both the transmitter 1652 and the receiver 1654, one or more antennas 1656 could be coupled to the transmitter(s) 1652, and one or more separate antennas 1656 could be coupled to the receiver(s) 1654. Each memory 1658 includes any suitable volatile and/or non-volatile storage and retrieval device(s).

Additional details regarding UEs 1610 and base stations 1670 are known to those of skill in the art. As such, these details are omitted here for clarity.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An asynchronous processing system, comprising:
   an asynchronous logic circuit configured to perform at least one processing function on input data;
   a controller configured to:
      identify from the at least one processing function, a type of processing to be performed by the asynchronous logic circuitry pursuant to the at least one processing function;
      determine from the identified type of processing, a processing delay period of time; and
      provide the processing delay period of time to a self-clocked generator coupled to the asynchronous logic circuit;
   the self-clocked generator configured to receive a trigger signal and output a self-clocking signal the processing delay period of time after receiving the trigger signal, wherein the processing delay period of time is configurable; and
   a data storage element configured to store processed data from the asynchronous logic circuit in response to the self-clocking signal.

2. The asynchronous processing system in accordance with claim 1 wherein the processing delay period of time is programmable within a range, wherein the range ensures sufficient time for completion of the processing function of the asynchronous logic circuit.

3. The asynchronous processing system in accordance with claim 1 wherein the processing delay period of time is selected from at least two possible different periods of time.

4. The asynchronous processing system in accordance with claim 3 wherein the processing delay period of time is selected in response to a processing instruction.

5. The asynchronous processing system in accordance with claim 4 wherein the processing delay period of time is selected based on an opcode associated with the processing instruction.

6. The asynchronous processing system in accordance with claim 1 further comprising:
   a second asynchronous logic circuit configured to perform at least one processing function on input data;
   a second self-clocked generator coupled to the second asynchronous logic circuit and configured to receive a second trigger signal and output a second self-clocking signal within a second processing delay period of time after receiving the second trigger signal, wherein the second processing delay period of time is configurable; and
   a second data storage element configured to store processed data from the second asynchronous logic circuit in response to the second self-clocking signal.

7. The asynchronous processing system in accordance with claim 1 wherein the asynchronous logic circuit comprises an arithmetic logic unit (ALU).

8. A method for operating an asynchronous processing system comprising asynchronous logic circuitry, the method comprising:
   receiving a first processing instruction;
   identifying from the first processing instruction a first type of processing to be performed by the asynchronous logic circuitry pursuant to the first processing instruction;
   determining from the identified first type of processing, a first processing delay period of time; and
   configuring a self-clock generator coupled to the asynchronous logic circuitry to output a self-clocking signal after receiving a trigger signal in accordance with the determined first processing delay period of time.

9. The method in accordance with claim 8 further comprising:
   processing, by the asynchronous logic circuitry, input data to generate processed output data; and
   storing the processed output data in memory in response to the self-clocking signal.

10. The method in accordance with claim 9 wherein the memory is a data latch, and the method further comprises:
    latching the processed output data into the data latch in response to the self-clocking signal.

11. The method in accordance with claim 8 further comprising:
    processing, by the asynchronous logic circuitry, input data to generate processed output data in accordance with the first type of processing and the first processing instruction;
    receiving a second processing instruction;
    identifying from the second processing instruction a second type of processing to be performed by the asynchronous logic circuitry pursuant to the second processing instruction;
    determining from the identified second type of processing, a second processing delay period of time; and
    configuring the self-clock generator coupled to the asynchronous logic circuitry to output another self-clocking signal after receiving another trigger signal in accordance with the determined second processing delay period of time.

12. The method in accordance with claim 11 wherein the first processing instruction is an adding instruction and the second processing instruction is a multiplication function, and wherein the first processing delay period of time is less than the second processing delay period of time.

13. The method in accordance with claim 8 wherein the asynchronous logic circuitry comprises an arithmetic logic unit (ALU).

14. The method in accordance with claim 8
wherein identifying from the first processing instruction the first type of processing to be performed by the asynchronous logic circuitry comprises:
at least partially decoding the processing instruction to determine an opcode.

* * * * *